United States Patent [19]
Steffes et al.

[11] Patent Number: 5,827,036
[45] Date of Patent: Oct. 27, 1998

[54] WHEELCHAIR LIFT

[75] Inventors: Paul Steffes; Kenneth S. Eberts, both of Dickinson, N. Dak.

[73] Assignee: Tip Top Mobility, Inc., Minot, N. Dak.

[21] Appl. No.: 623,354

[22] Filed: Mar. 28, 1996

[51] Int. Cl.[6] .................................................. B60R 9/00
[52] U.S. Cl. .......................................... 414/462; 224/310
[58] Field of Search ............................ 414/462; 224/309, 224/310, 320

[56] References Cited

U.S. PATENT DOCUMENTS

| | | | |
|---|---|---|---|
| 3,823,839 | 7/1974 | Petzing et al. | |
| 3,878,955 | 4/1975 | Udden. | |
| 4,039,096 | 8/1977 | McAllister | 414/462 |
| 4,113,127 | 9/1978 | Clement. | |
| 4,134,509 | 1/1979 | Clement | 414/462 |
| 4,236,860 | 12/1980 | Gottlieb et al. | 414/462 |
| 4,242,030 | 12/1980 | Clement | 224/310 |
| 4,245,947 | 1/1981 | Clement | 224/310 |
| 4,272,218 | 6/1981 | Carter | 414/462 |
| 4,376,611 | 3/1983 | Koop | 414/462 |
| 4,400,129 | 8/1983 | Eisenberg et al. | 414/462 |
| 4,440,540 | 4/1984 | Gottlieb et al. | 414/462 |
| 4,484,851 | 11/1984 | Gottlieb et al. | 414/462 |
| 4,664,854 | 5/1987 | Braun et al. | 414/541 |
| 5,261,779 | 11/1993 | Goodrich | 414/546 |

*Primary Examiner*—Karen B. Merritt
*Assistant Examiner*—Gregory A. Morse
*Attorney, Agent, or Firm*—Moore & Hansen

[57] ABSTRACT

The wheelchair lift invention mounts to the roof of a vehicle such as an ordinary automobile using commonly available mounting hardware used for attaching a variety of rooftop storage containers to such vehicles. The wheelchair lift, powered by the vehicle's battery, is remotely operable from the driver's seat of the vehicle using a handheld or dash mounted controller. The preferred embodiment permits easy attachment of the wheelchair to a lifting assembly, which is then elevated with the assistance of an electric motor to a rooftop platform. Once securely positioned in a generally flat orientation, a hingedly attached cover member is lowered over the wheelchair and lifting assembly, and latched into position to the platform or support assembly.

30 Claims, 10 Drawing Sheets

WHEELCHAIR LIFT

BACKGROUND OF THE INVENTION

1. Technical Field

The present invention relates generally to wheelchair storage device positioned on the roof of a vehicle. More particularly, the wheelchair storage device includes a mechanism for lifting and storing the wheelchair while the vehicle is being driven by the person who uses the wheelchair, then lowers the wheelchair from the rooftop storage area when that person wishes to use it, as when they reach their destination.

2. Background Information

Wheelchair storage devices positioned on vehicle rooftops have been available for several years. Such prior devices are frequently quite heavy, requiring additional bracing under the roof of the car to reinforce the car roof for support of the weight of the storage device. Certain of these devices are also known to be unnecessarily complex, requiring as many as three electric motors for proper operation.

In an effort to develop lighter wheelchair storage units, many resulting devices lacked the sturdiness to withstand strong headwinds or crosswinds. In addition, the drive mechanisms of many wheelchair storage units are quite complex. To reduce weight and cost, many of these drive mechanisms were made of inferior parts or materials, or lacked the workmanship necessary to provide many years of reliable service.

Furthermore, structural modifications, including but not limited to internal bracing, are often required of vehicles before prior art wheelchair storage units may be reliably attached to them. These modifications generally result in a devaluation of the vehicle, because of unsightly holes, rust or paint damage caused by the storage devices.

The wide variety of sizes and shapes of vehicles has also been difficult for prior art wheelchair storage units to accommodate. Many of these devices may be used only with certain types of automobiles, such as four-door sedans, for example, eliminating access to the back seat of the vehicle from the driver's side, or with certain sizes of vehicles, such as so-called mid-size or larger cars. These limitations place additional, unneeded burdens on the handicapped persons who rely on their vehicles for transportation, who desire easy access to the back seat of their car, and for whom larger vehicles are an unnecessary expense.

Additionally, wheelchairs also come in a wide variety of shapes and styles, and many prior art wheelchair storage units have been unable to accommodate these various styles. Thus, if a wheelchair user's job or lifestyle requires a high level of mobility, their choice of wheelchair may be limited to particular sizes or styles that may be accommodated by a particular wheelchair storage unit. Furthermore, such conventional wheelchair elements as leg rests are not capable of being accommodated by some prior art carriers. To enable use of these carriers, the leg rests must be removed prior to storage therein, resulting in further inconvenience and difficulty to the person using the wheelchair.

Certain climatic factors have also affected the reliability and performance of prior wheelchair lifts. For example, certain prior art devices have been known to rely on relatively delicate limit switches to control the operating mechanism. Similarly, springs of various sizes have been used to aid in operation. Furthermore, to save weight or expense, many prior devices have done without a lower deck in the storage area. In some geographic regions, particularly humid areas and areas near oceans, the salt air and humidity can accelerate corrosion of certain components of the mechanism. Similarly, in the absence of a lower deck in the storage area, flying insects, rain, snow and slush may easily enter the storage area while the vehicle is travelling, allowing the wheelchair stored therein to become dirty or rusty. Finally, prior art devices sometimes rely on cables for raising and lowering the wheelchair to and from the storage area. The cables can become dirty or worn, resulting in inconsistent performance or even damage to the device or the wheelchair.

The wheelchair lift of the present invention overcomes difficulties described above and affords other features and advantages heretofore not available.

SUMMARY OF THE INVENTION

The wheelchair lift of the present invention mounts to the roof of a vehicle such as an ordinary automobile using commonly available mounting hardware used for attaching a variety of rooftop storage containers to such vehicles. The wheelchair lift, powered by the vehicle's battery, is remotely operable from the driver's seat of the vehicle using a handheld or dash mounted controller. The preferred embodiment permits easy attachment of the wheelchair to a lifting assembly, which is then elevated with the assistance of an electric motor to a rooftop platform. Once securely positioned in a generally flat orientation, a hingedly attached cover member is lowered over the wheelchair and lifting assembly, and latched into position to the platform or support assembly.

The overall operation of the mechanism, including raising and lowering of the cover and lifting and lowering the wheelchair, is controlled by a single motorized linear actuator. When closed, actuation of the mechanism initiates extension of the linear actuator, first lifting the cover and then lifting, extending and lowering the wheelchair contained therein to the ground. Use of the single linear actuator minimizes the complexity of the system, resulting in a wheelchair lift that is less costly to produce, simpler to assemble, lighter and more reliable than prior devices that performed similar functions.

It is an object of the present invention to provide a sturdy, lightweight, reliable and easy to use wheelchair storage device locatable on the roof of a vehicle. It is a further object of the present invention to provide such a wheelchair lift that is affordable, easy to maintain and repair, and that provides suitable protection form the elements to the wheelchair stored therein. It is a further object of this invention to provide a wheelchair lift that may be easily installed on a vehicle without structural modifications to the vehicle and using readily available hardware for attachment.

Other objects and advantages of the invention will become apparent from the following detailed description and from the appended drawings in which like numbers have been used to describe like parts throughout the several views.

DESCRIPTION OF THE PREFERRED EMBODIMENT

Figure 1:
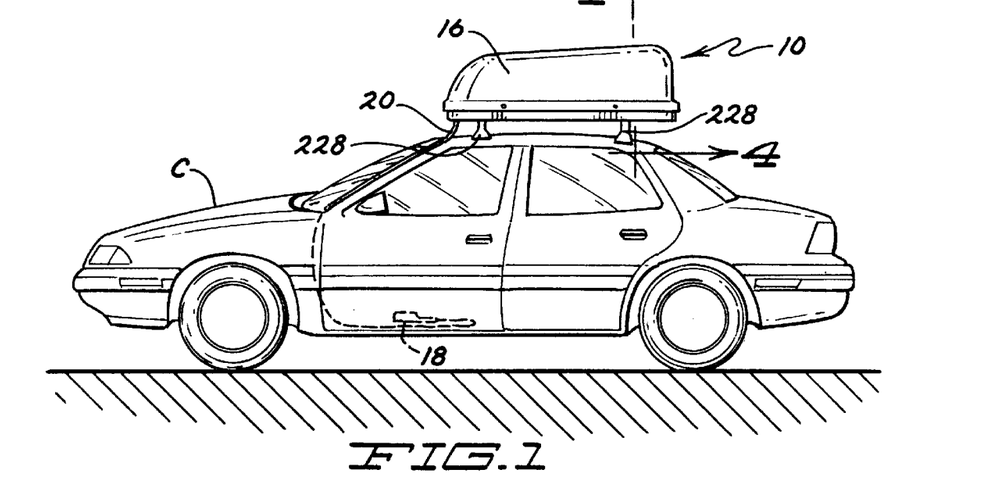
FIG. 1 is a side elevation of a vehicle with a wheelchair lift of the present invention attached to the roof thereof in the travel position.

With reference to the drawings, and in particular to FIG. 1, the wheelchair lift is generally indicated by reference numeral 10, and is illustrated mounted on the roof of a vehicle C. Also referring to FIG. 2, the main elements of wheelchair lift 10 are the lifting assembly 12, the extension assembly 14 and the hood 16. Lifting assembly 12 is motivated by powered linear actuator 13. Also illustrated in FIGS. 1 and 2 are a remote control in the form of pendant 18, cable 20 connecting handheld pendant 18 to lifting assembly 12, and a wheelchair W.

Figure 2:
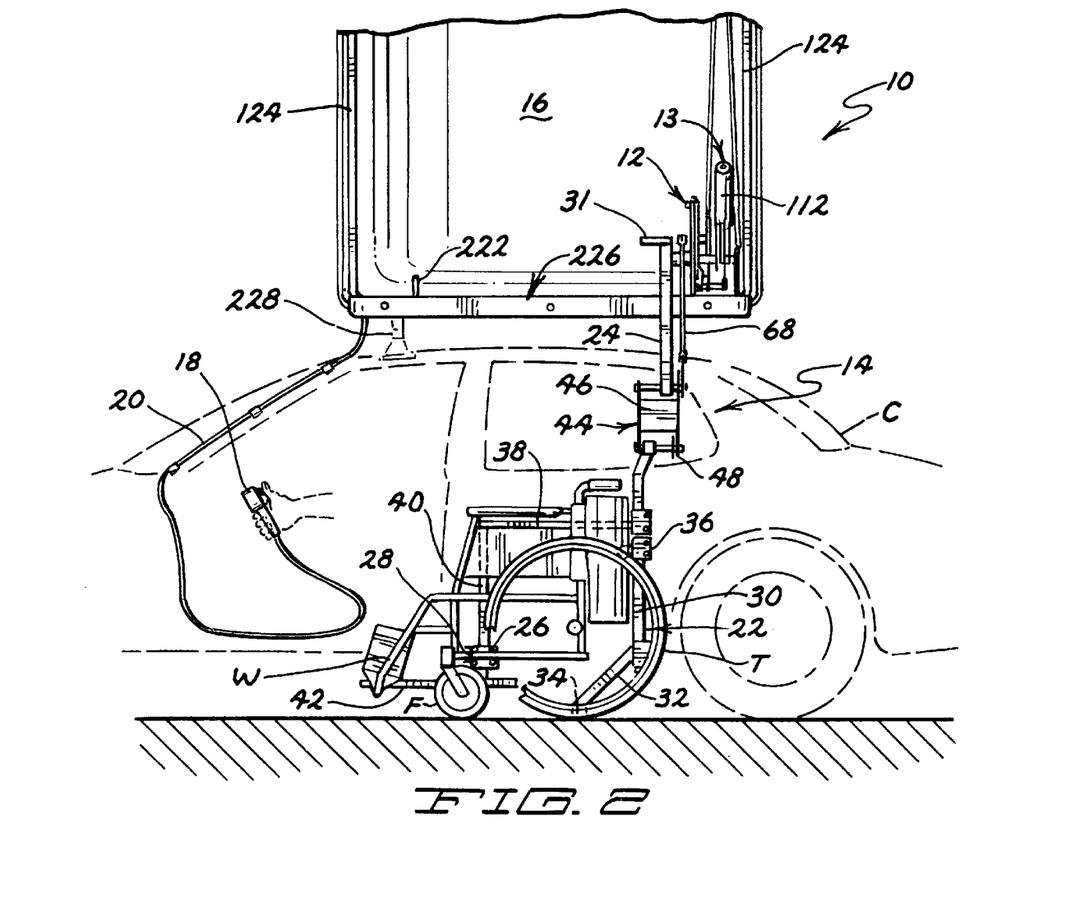
FIG. 2 is a side elevation similar to FIG. 1 showing the hood of the wheelchair lift in the open position and the lifting assembly fully extended.
Figure 3:
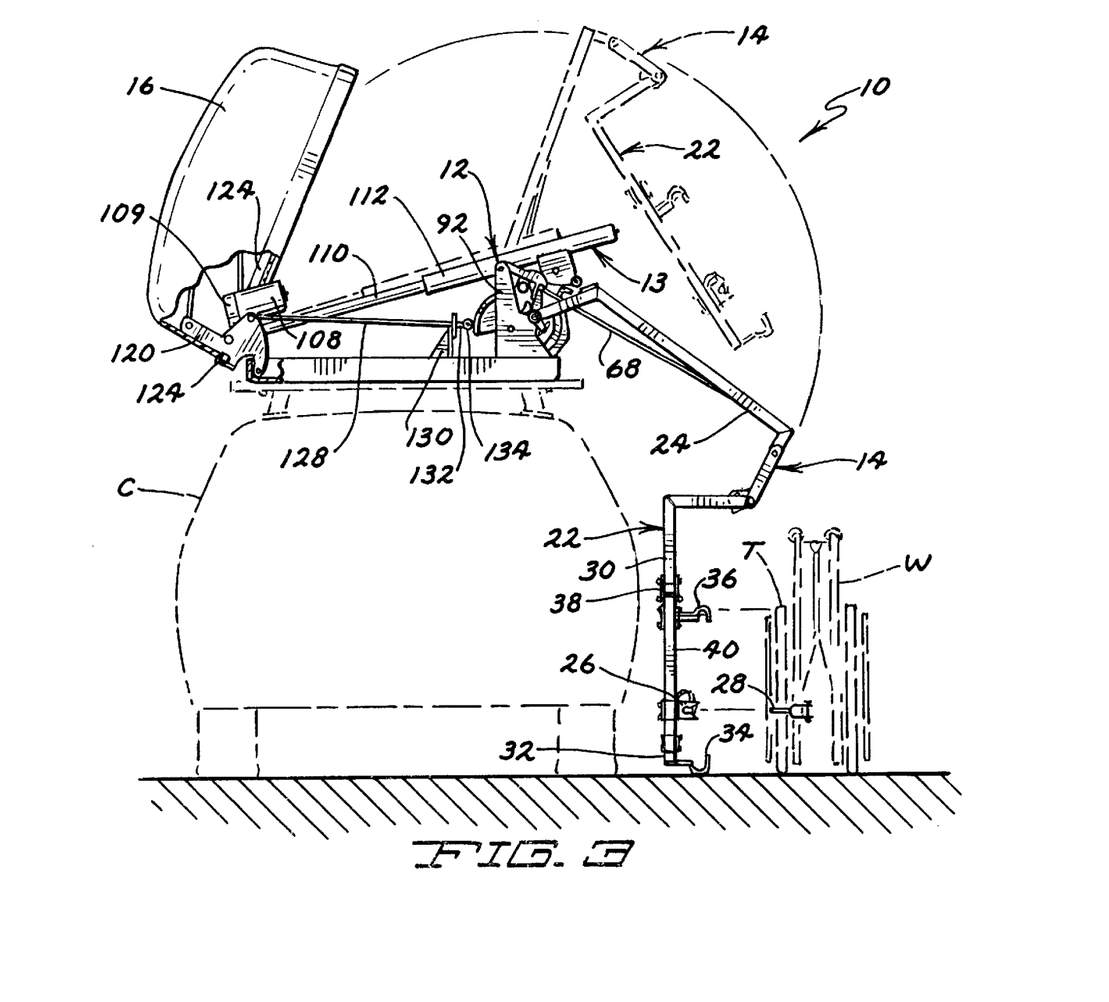
FIG. 3 is a front elevation showing the lifting assembly fully extended and in an intermediate position partially extended from the storage area.

Referring to FIG. 3, extension assembly 14 includes attachment portion 22, to which is releasably attached wheelchair W, and swing arm 24. Attachment portion 22 includes a spring-loaded latch member 26, similar to a conventional gate latch, releasably engageable with a hook member 28 fixedly attached to the frame of wheelchair W. Before engaging hook member 28 with latch member 26, the right tire T of wheelchair W must be positioned as shown in FIG. 1. As illustrated in FIG. 2, attachment portion 22 of extension assembly 14 includes a wheelchair arm 30 and an attachment bar 32 connected to an end thereof. When in the storage position, wheelchair arm 30 bears against arm stop 31, which is fixedly attached as by welding to swing arm 24. Connected to the end of attachment bar 32 is a generally U-shaped lower wheel constraint 34 for engaging right tire T of wheelchair W. Attachment bar 32 is adjustably connected to wheelchair arm 30 so that wheelchairs having tires T of various sizes may be accommodated. Also adjustably connected to wheelchair arm 30 is generally U-shaped upper wheel constraint 36 for engaging right tire T of wheelchair W. Projecting generally horizontally from wheelchair arm 30, and adjustably connected thereto, is upper latch arm member 38. Connected to and downwardly depending from upper latch arm member 38 is lower latch arm member 40, to which spring-loaded latch 26 is connected for releasably engaging hook member 28 of wheelchair W. Fixedly connected to the lower end of lower latch arm member 40 is front wheel guide 42, for maintaining the position of front wheel F, to prevent it from pivoting during loading and unloading, which may interfere with proper operation of wheelchair lift 10.

Figure 12:
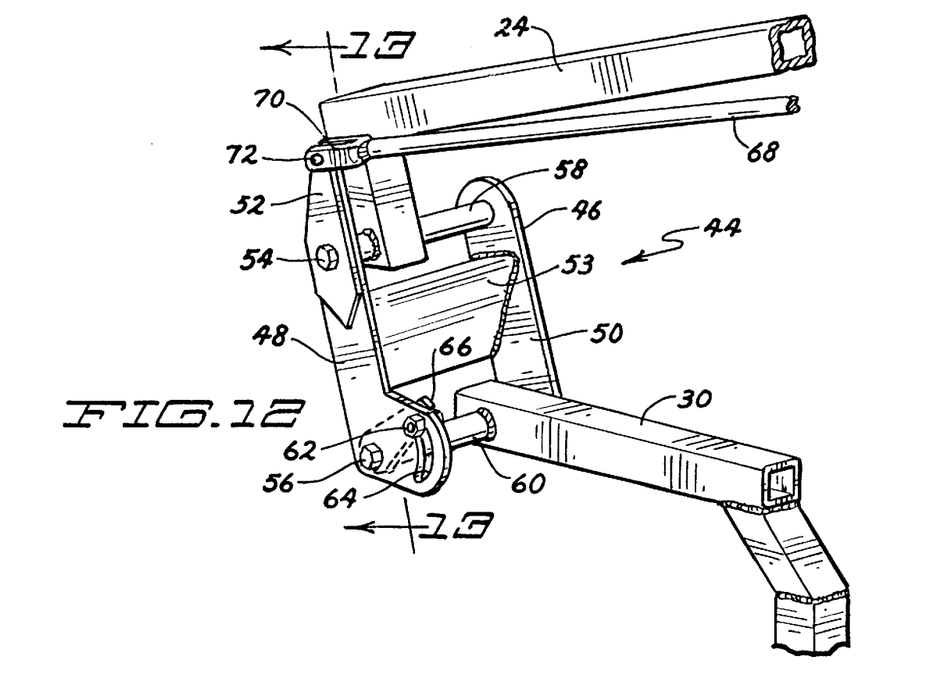
FIG. 12 is a rear perspective view of the extension assembly.
Figure 13:
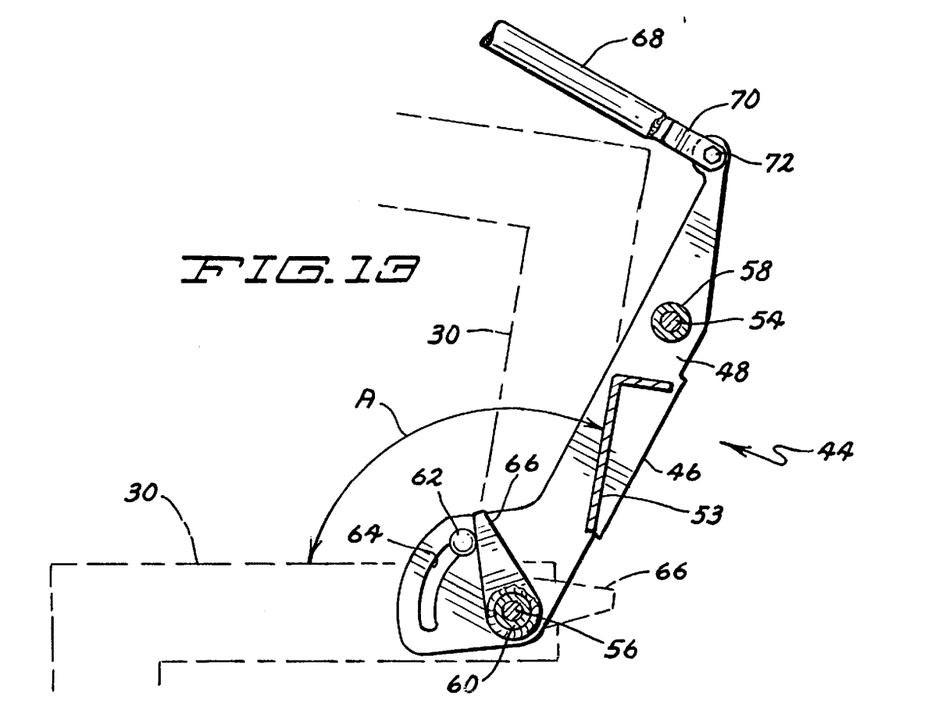
FIG. 13 is a side elevation taken along line 13—13 of FIG. 12.

As illustrated in FIGS. 2, 12 and 13, extension assembly 14 also includes hinged adjustment portion 44, positioned between swing arm 24 and wheelchair arm 30. As well as providing a needed hinge point for extension assembly 14, hinged adjustment portion 44 also permits adjustment of the final angle of incidence between wheelchair W and the surface to which it is being unloaded. To this end, hinged adjustment portion 44 includes an H-bracket 46 having first and second side members 48, 50 respectively. First side member 48 also preferably includes a stiffener 52 welded thereto. Also extending between first and second side members 48, 50 is angled brace 53 for strengthening H-bracket 46. Angled brace 53 is preferably fixedly attached as by welding to first and second side member 48, 50, respectively.

H-bracket 46 hingedly attaches to swing arm 24 with first hinge pin 54, and H-bracket 46 hingedly attaches to wheelchair arm 30 with second hinge pin 56. First and second hinge pins 54, 56 pass through first and second pivot sleeves 58, 60, respectively. First pivot sleeve 58 is fixedly attached as by welding to swing arm 24, and second pivot sleeve 60 is fixedly attached as by welding to wheelchair arm 30. Adjustment of hinged adjustment portion is accomplished by relocating positioning bolt 62 within positioning slot 64 of first side member 48. Adjustment stop 66, which is fixedly attached as by welding to second pivot sleeve 60 and travels in relation to wheelchair arm 30, bears against positioning bolt 62. Referring to FIG. 13, arrow A indicates the angle through which wheelchair arm 30 may swing relative to H-bracket 46 during the extension and retraction cycles of wheelchair lift 10. Adjustment of the location of positioning bolt 62 within positioning slot 64 determines the size of the angle through which wheelchair arm 30 may swing before adjustment stop 66 encounters positioning bolt 62. As may also be seen in FIG. 13, the configuration of angled brace 53 is determined by the need to avoid interference with wheelchair arm 30 when wheelchair lift 10 is fully retracted.

Also pivotally attached to first side member 48 of H-bracket 46 is main linkage member 68. Linkage member 68 is attached to first side member 48 by first linkage yolk 70, through which passes a bolt 72. The other ends of linkage member 68 and swing arm 24 are attached to the lifting assembly 12 of wheelchair lift 10. Specifically, second linkage yolk 76 of linkage member 68, and the second end of swing arm 24, are attached to linkage control arm 78.

Figure 5:
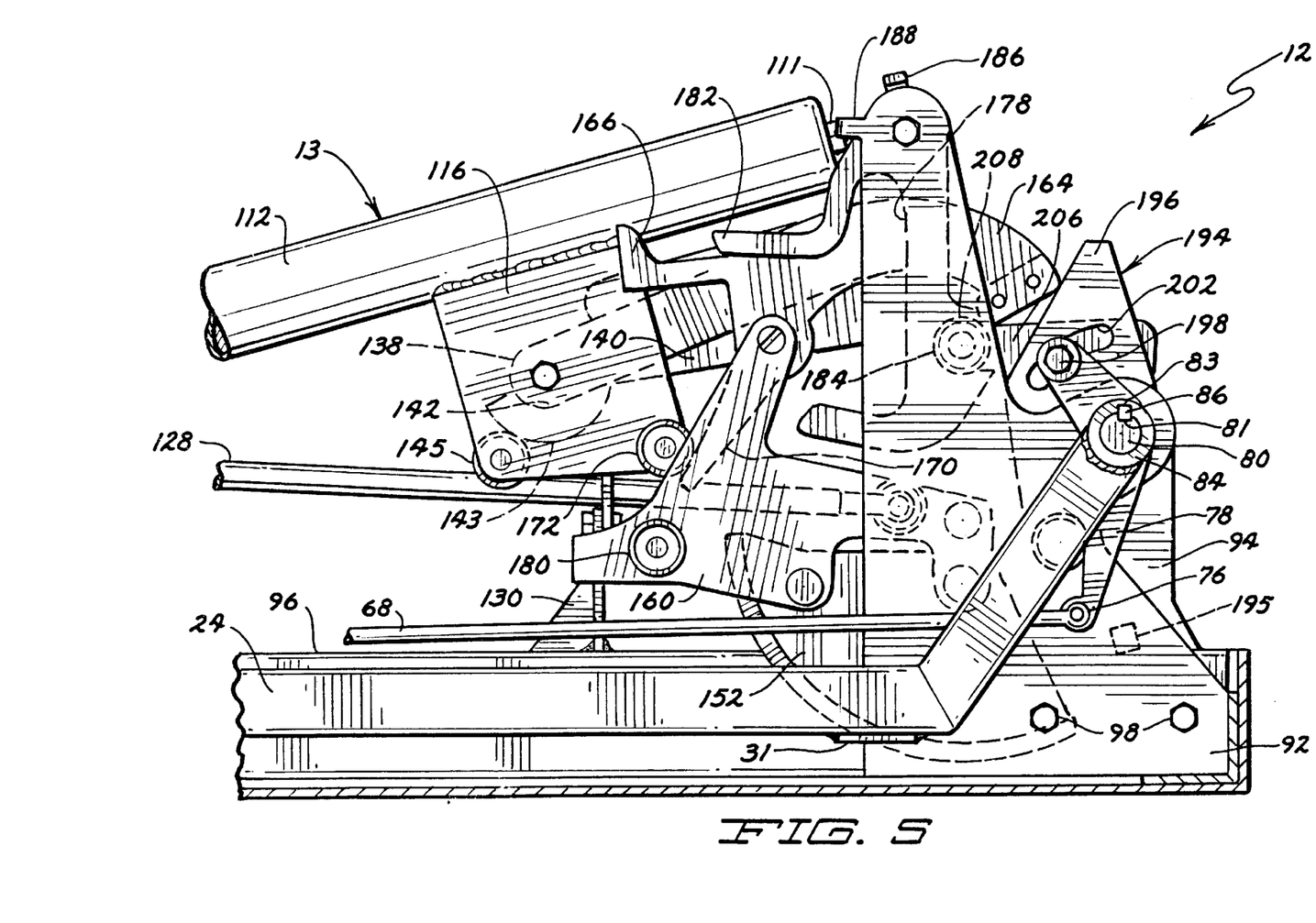
FIG. 5 is a detailed front elevation of the lifting assembly of the present invention in the fully retracted, travel position.
Figure 6:
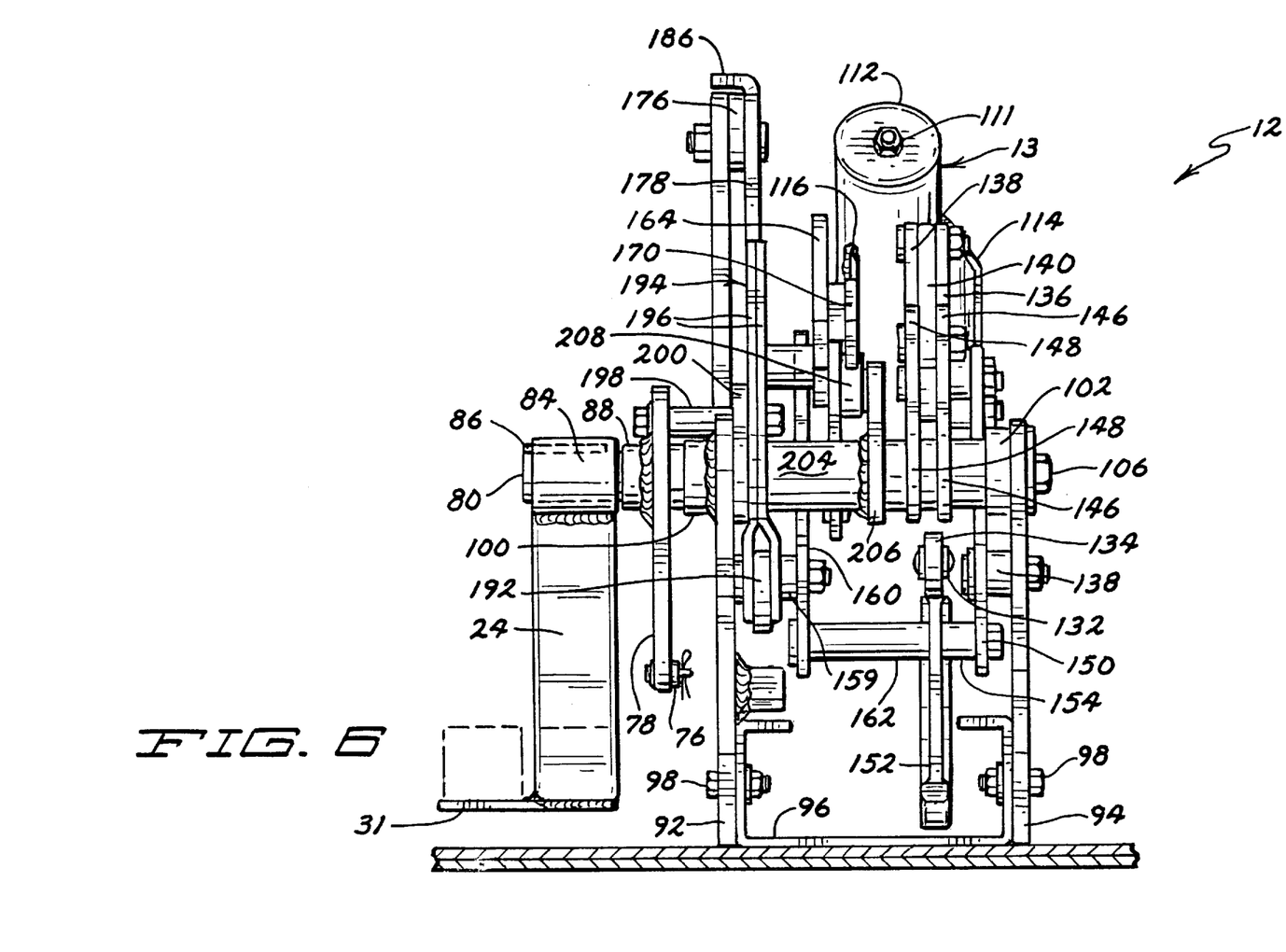
FIG. 6 is a detailed side elevation of the lifting assembly illustrated in FIG. 5.
Figure 8:
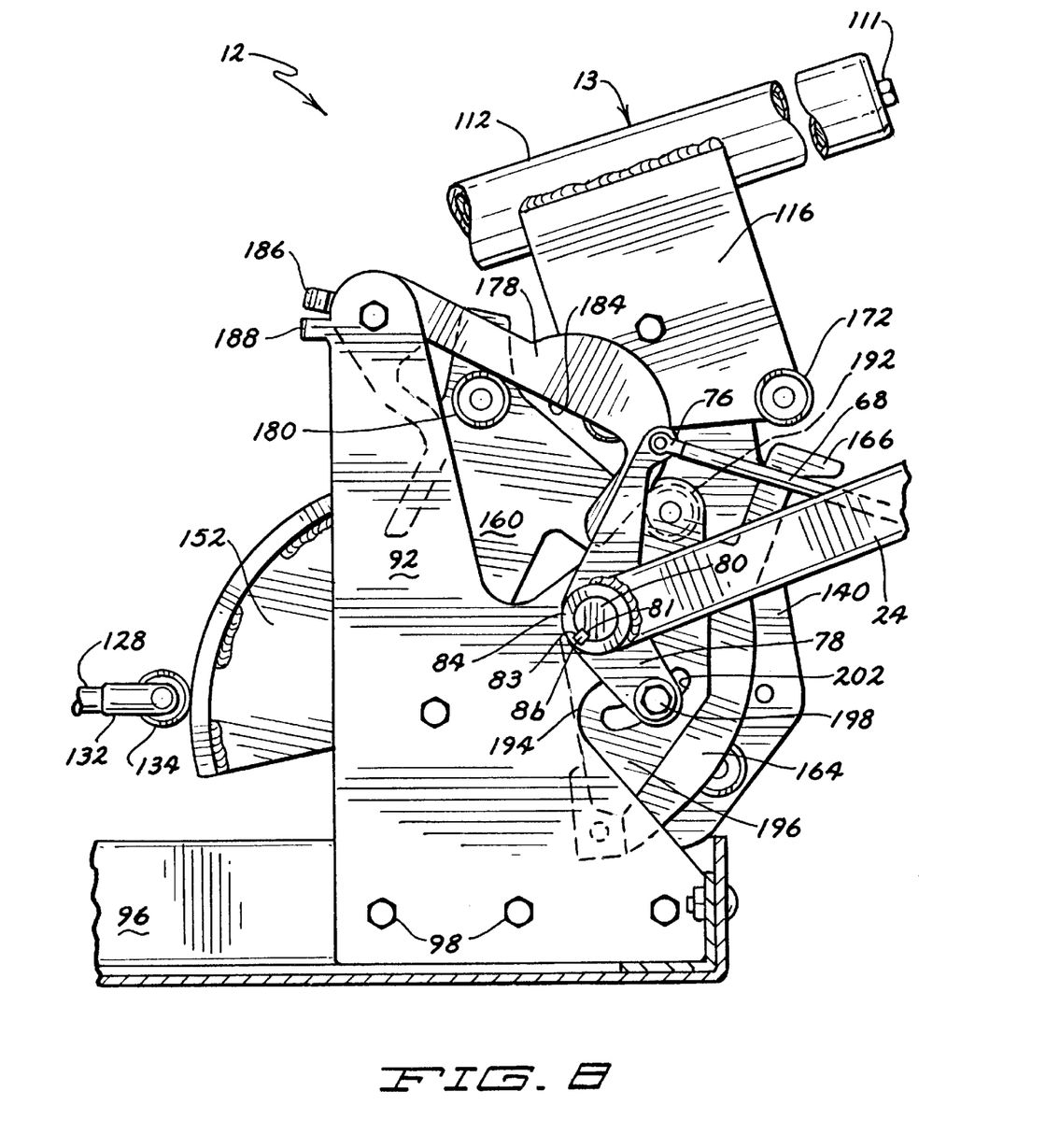
FIG. 8 is a detailed front elevation of the lifting assembly of the present invention in the fully extended position.

As illustrated in FIGS. 5, 6 and 8, swing arm 24 is mounted to main shaft 80, which passes through central opening 82 of linkage control arm 78. The end of swing arm 24 includes welded thereto a shaft sleeve 84 through which main shaft 80 passes. Main shaft 80 and shaft sleeve 84 include corresponding groove members 81, 83, respectively, forming a slot into which cotter key 86 is inserted to ensure that swing arm 24, to which shaft sleeve 84 is fixedly attached, rotates in concert with main shaft 80. Central opening 82 of linkage control arm 78 includes welded thereto a control arm sleeve 88 within which is positioned a control arm bearing 90, through which main shaft 80 is rotatably mounted. For support, main shaft 80 is rotatably mounted, as shown in FIG. 6, to inside frame plate 92 and outside frame plate 94. Frame plates 92, 94 are maintained in position relative to each other by generally U-shaped support member 96, to which the frame plates are preferably attached as by bolts 98. For rotatably supporting main shaft 80, inside frame plate 92 includes welded thereto a first flange bearing 100 extending outwardly therefrom.

The other end of main shaft 80 is supported within second flange bearing 102, inserted within the support hole 104 of outside frame plate 94. A threaded hole is tapped into the end of main shaft 80, and a screw 106 is threadedly engaged therein.

Figure 4:
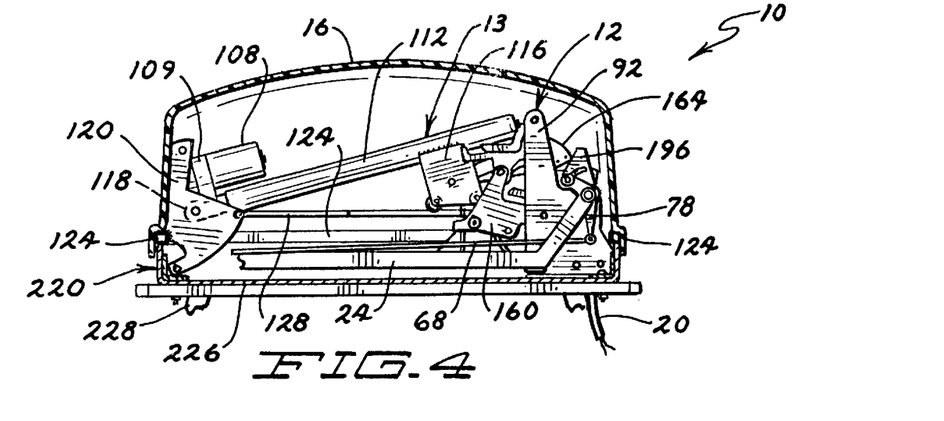
FIG. 4 is a front elevation taken along line 4—4 of FIG. 1.

An overall front end view of lifting assembly 12 is represented in detail in FIGS. 3 and 4. The lifting assembly is motivated by powered linear actuator 13. Powered linear actuator 13 is driven by electric motor 108, which draws power from the battery of vehicle C through cable 20. Electric motor 108, mounted to actuator housing 109, drives a screw (not shown) that threadedly engages an inner tube (not shown), which in turn is attached as by bolt 111 to outer tube 112. As electric motor 108 drives the hidden screw, outer tube 112 is moved toward or away from actuator housing 109, depending on the direction of rotation of the hidden screw. A non-rotating sheath 110, which is also mounted to actuator housing 109, is provided to protect the hidden screw and inner tube. Electric motor 108 drives the hidden screw with gears, not shown, contained within housing 109. The preferred linear actuator, including electric motor 108 mounted to actuator housing 109, is manufactured by Von Wiese Gear Co. of St. Clair, Mont., model number V07057AB76. Linear actuator outer tube 112 includes weldedly attached thereto a right side drive plate 114 and a left side drive plate 116. Drive plates 114, 116 connect actuator outer tube 112 to lifting assembly 12. Projecting rearwardly of actuator housing 109 is attachment member 118, through which passes a bolt (not shown) for pivotal attachment of actuator housing 109 to inside and outside hinge members 120, 122, respectively. As shall be seen with reference to FIG. 10, inside and outside hinge members 120, 122 are fixedly attached to hood frame 124. Attachment member 118 of actuator housing 109 is pivotally attached to hinge members 120, 122 using a bolt passing through holes 126 therein. As also illustrated in FIGS. 3 and 4, a hood control linkage 128 is pivotally attached to inside hinge member 120. Hood control linkage 128 is slidably supported by hood control linkage support 130, which is fixedly attached to support member 96. The distal end of hood control linkage 128 includes a control linkage yolk 132 containing a roller 134, the use of which will be disclosed.

Figure 7:
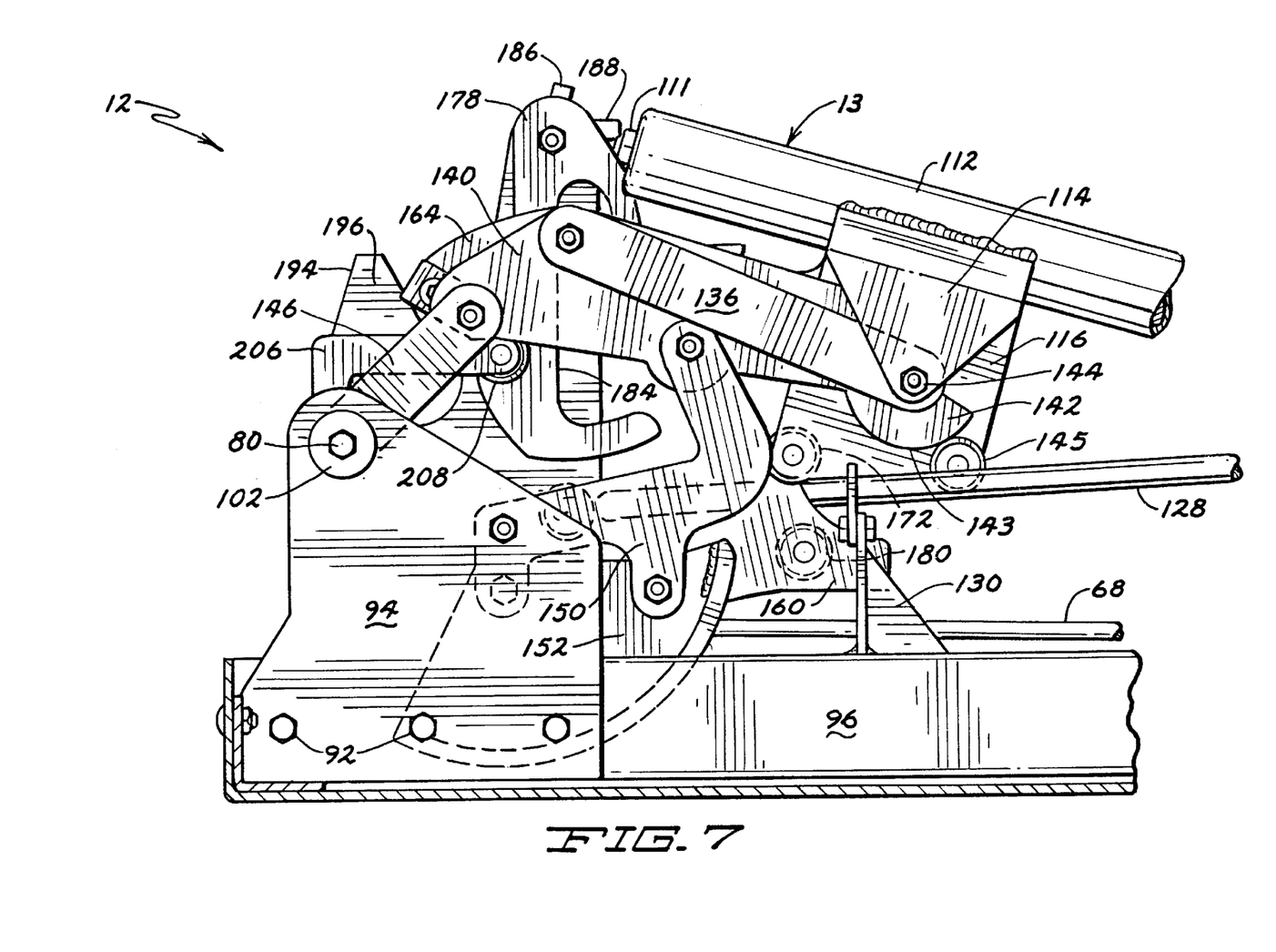
FIG. 7 is a detailed rear elevation of the lifting assembly illustrated in FIGS. 5 and 6.
Figure 11:
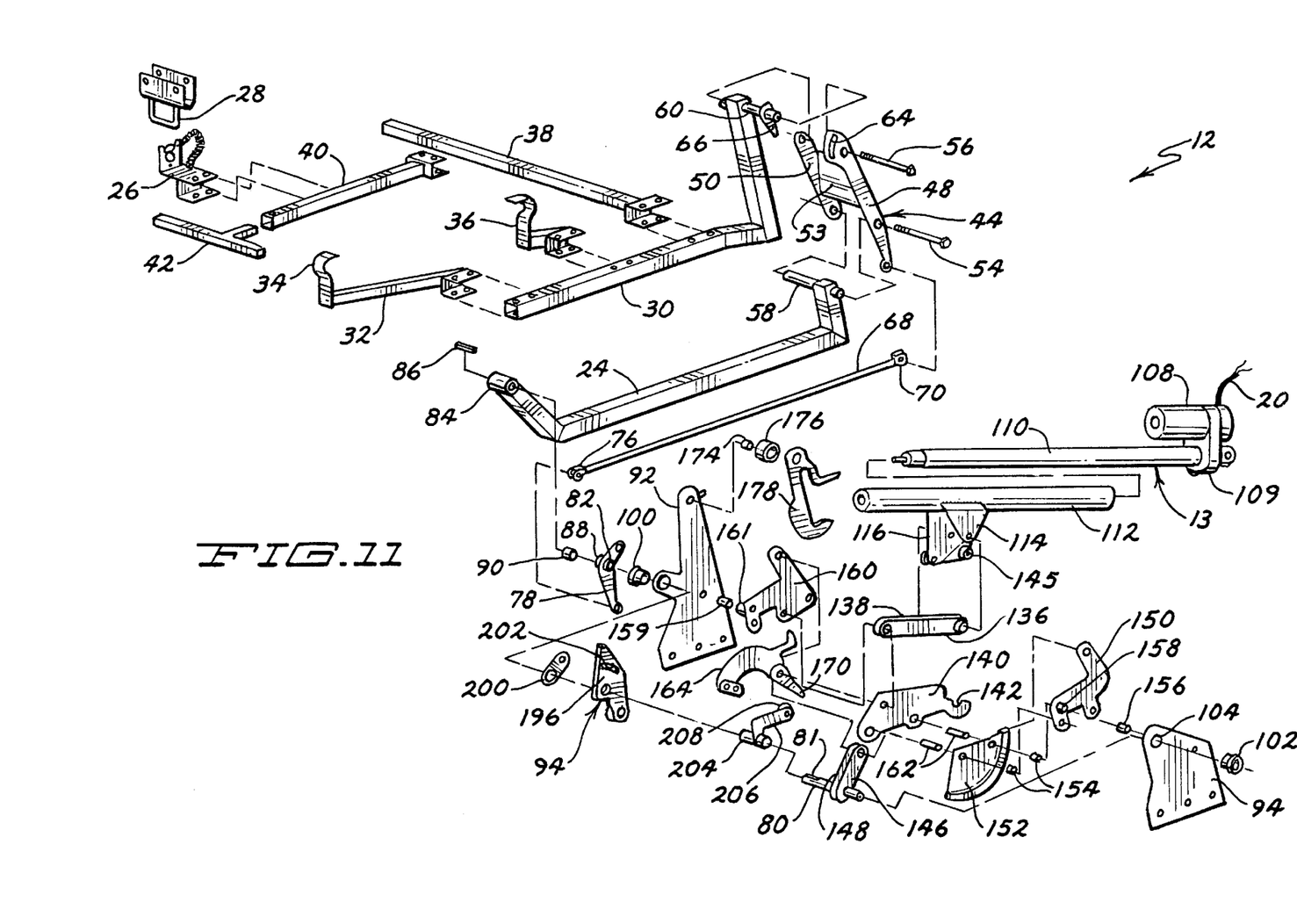
FIG. 11 is an exploded view of the lifting and extension/attachment assemblies of the present invention.

Referring to FIG. 7, pivotally attached to outside drive plate 114 is first overrun linkage member 136. A corresponding and identical second overrun linkage member 138 is pivotally connected to inside drive plate 116, as shown in FIG. 5. Together, overrun linkage members 136, 138 form an overrun linkage assembly. Positioned between first and second overrun linkage members 136, 138, and pivotally attached, as best shown in FIG. 11, to the ends opposite their respective attachment points to inside and outside drive plates 114, 116, is center split linkage 140. Center split linkage 140 cooperates with the overrun linkage assembly to allow the mechanism to overrun without damaging the mechanism or the vehicle once the wheelchair has reached ground level. As most clearly illustrated in FIG. 11, center split linkage 140 includes a notched end 142. The concave portion of notched end 142 normally bears against the single bolt 144 that extends between first and second overrun linkage members 136, 138, and pivotally attaches them to outside and inside drive plates 114, 116, respectively. However, referring to FIG. 9, when wheelchair lift 10 is fully extended, electric motor 108 continues to run at least momentarily once the wheelchair comes into contact with the ground. With electric motor 108 running, linear actuator outer tube 112 continues to extend. To avoid damaging the wheelchair or the vehicle, the concave surface of notched end 142 of center split linkage permits linear actuator outer tube 112 to continue to extend without forcing the entire mechanism to extend with it. The cammed surface 143 of notched end 142 of center split linkage 140 bears against roller bearing 145, rotatably attached to inside drive plate 116, as may be seen in FIGS. 5 and 9, maintaining center split linkage 140 in contact and proper relationship with the components of lifting assembly 12 during extension and retraction thereof.

Figure 9:
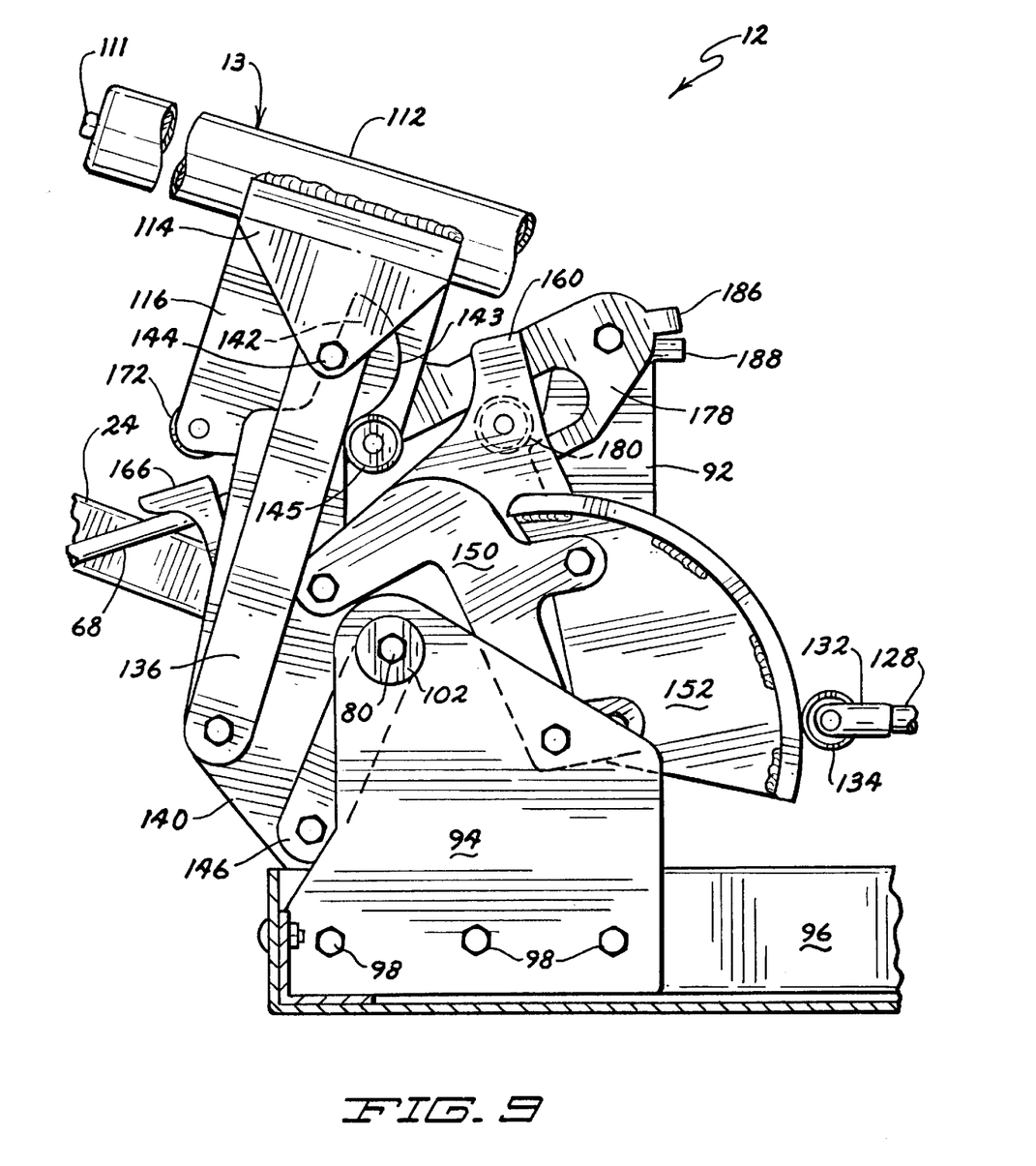
FIG. 9 is a detailed rear elevation of the lifting assembly illustrated in FIG. 8.

Referring to FIGS. 7, 9 and 11, center split linkage 140 is also rotatably linked to an end of the main torque arm, which comprises first torque arm element 146 and second torque arm element 148. The main torque arm serves to transfer the thrust from powered linear actuator 13 to torque on main shaft 80 to accomplish rotation of swing arm 24.

Referring to FIGS. 6 and 7, center split linkage 140 is additionally rotatably attached to right connecting arm 150, which in turn is attached to hood control disk 152 by hood control disk right side spacers 154. Right connecting arm 150 is also rotatably attached to outside frame plate 94, to which it is connected by bearing 156, partially inserted within sleeve 158. Referring to FIGS. 5 and 6, hood control disk 152 is also attached to left connecting arm 160 by hood control disk left side spacers 162. As may be seen, left connecting arm 160 is in turn pivotally connected to squaring cam 164. Left connecting arm 160 is also pivotally mounted to inside frame plate 92 with left connecting arm sleeve 159 and sleeve bearing 161. Squaring cam 164 helps ensure that the wheelchair lift is properly positioned when fully retracted. Attached as by welding to squaring cam 164 is squaring cam control 170. First roller bearing 172 of inside drive plate 116 bears against squaring cam control 170, causing squaring cam 164 to be lowered to the resting position shown in FIG. 5 as lifting assembly 12 is retracted to the storage position by powered linear actuator 13.

Referring again to FIGS. 5 and 6, rotatably attached to inside frame plate 92 as by bearing 174 and spaced therefrom by spacer 176 is parallel control cam 178. As the wheelchair lift extends outwardly from the storage position shown in FIGS. 5–7, roller bearing 180 rotatably attached to left connecting arm 160 engages the extended portion 182 of parallel control cam 178. Parallel control cam 178 pivots about bearing 174, engaging and moving in concert with left connecting arm 160. As they travel together, roller bearing 180 of left connecting arm 160 bears against the inner edge 184 of parallel control cam 178. As shown in FIGS. 8 and 9, once the wheel chair lift has reached its fully extended position, control tab 186 of parallel control cam 178 engages limiting member 188 of inside frame plate 92. As parallel control cam 178 rotates, cammed surface 190 thereof engages roller bearing 192 rotatably attached to horizontal control adjuster assembly 194. Horizontal control adjuster assembly 194 is mounted to main shaft 80, and includes identical left and right control adjuster plates 196, between which is rotatably captured roller bearing 192. When cammed surface 190 of parallel control cam 178 engages roller bearing 192, horizontal control adjuster assembly 194 is urged outwardly, assuring that extension assembly 14 will clear the side of vehicle C. The clearance from the side of the vehicle is adjustable using linkage control arm 78, to which is attached adjustment bolt 198. Adjustment bolt 198 also passes through torque transfer arm 200 before adjustably engaging slots 202 in control adjuster plates 196 of horizontal control adjuster assembly 194. Torque transfer arm 200 is attached as by welding to the first end of torque transfer arm sleeve 204, about which also rotates horizontal control adjuster assembly 194.

The second end of torque transfer arm sleeve 204 is attached as by welding to linkage control arm 206. On its opposite end, linkage control arm 206 has roller bearing 208 rotatably attached thereto. Squaring cam control 170 bears against roller bearing 208 during operation of wheelchair lift 10.

Figure 10:
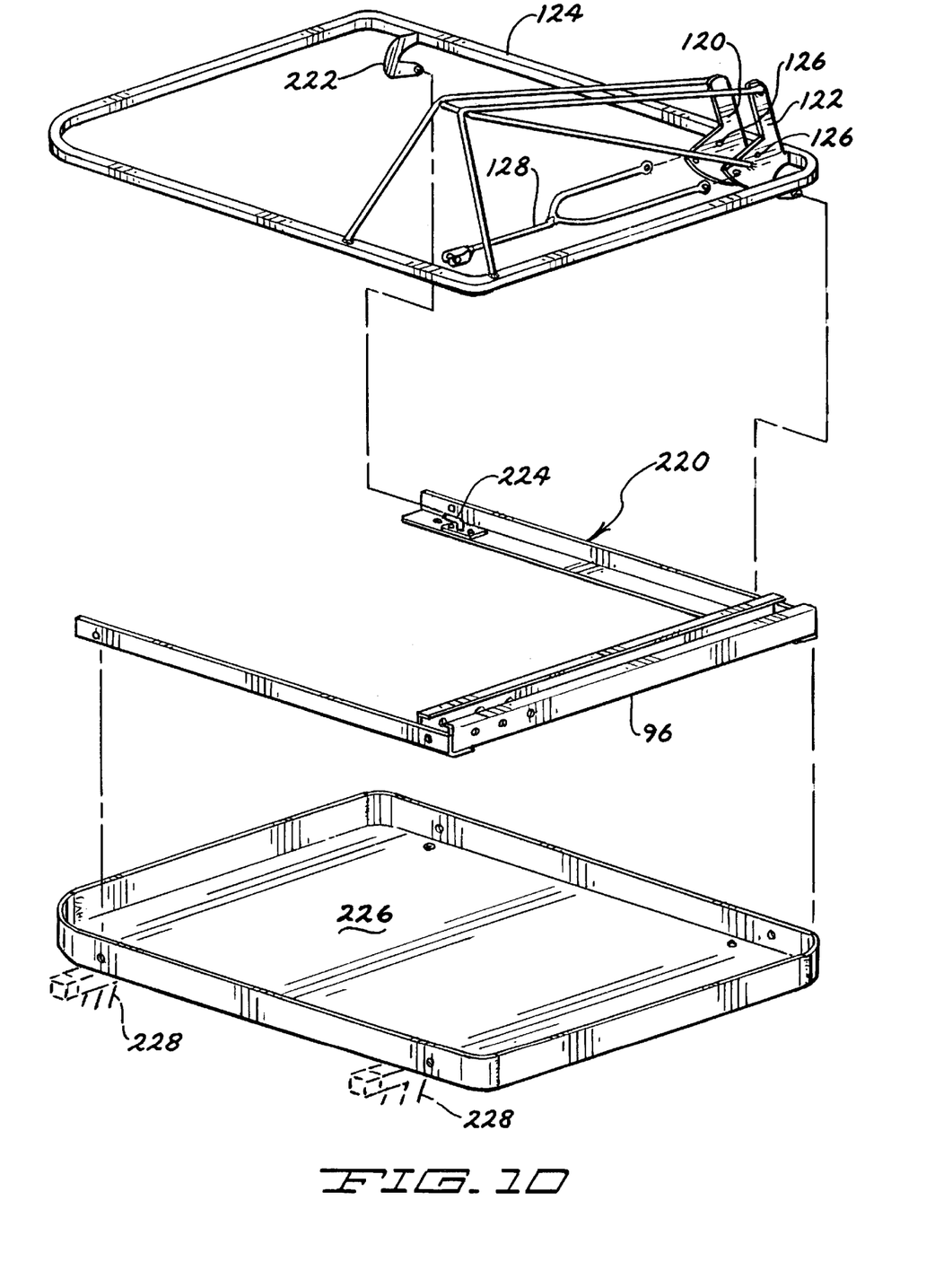
FIG. 10 is an exploded perspective view of the frame and support assembly of the present invention.

FIG. 10 shows hood frame 124 to which hood 16 is attached. In turn, lifting assembly 12 is also attached to hood frame 124 through inside hinge member 120 and outside hinge member 122, which are fixedly attached as by welding to hood frame 124. The position of hood frame 124, and thereby hood 16, is controlled by lifting assembly 12 and powered linear actuator 13 through hood control linkage 128, which is pivotally attached to inside and outside hinge members 120, 122, respectively, through hinge member holes 126. As outer tube 112 of powered linear actuator 13 extends from the storage position illustrated in FIG. 4 to the extended position illustrated in FIG. 3, roller 134 of hood control linkage 128 is in the location shown in FIG. 5. Actuation of powered linear actuator 13, and the accompanying extension of outer tube 112, initially results in the raising of hood 16 to the elevated position shown in FIG. 3. As hood 16 elevates, roller 134 of hood control linkage 128 withdraws to the position shown in FIGS. 3, 8 and 9. When hood 16 is fully elevated, the continued extension of outer tube 112 actuates lifting assembly 12, which is directly linked to outer tube 112 through drive plates 114, 116, resulting in the rotation of hood control disk 152 from the position shown in FIGS. 5 and 7 to the position shown in FIGS. 8 and 9. When wheelchair lift 10 is in the extended position shown in FIG. 3, hood control linkage 128, in cooperation with hood control disk 152, helps ensure that hood 16 remains open.

When wheelchair W is elevated from the extended position shown in FIG. 3 to the storage position of FIG. 4, roller 134 initially continues to bear against hood control disk 152, maintaining hood 16 in the open position. Therefore, powered linear actuator 13 causes lifting assembly 12 to draw extension assembly 14 to the storage position shown in FIG. 4, at which point hood control disk 152 rotates to a position that permits roller 134 of hood control linkage 128 to extend to the position shown in FIGS. 5 and 7, thus permitting hood 16 to lower to the closed position shown in FIG. 4.

Hood frame 124 is itself pivotally attached to main frame assembly 220 through outside hinge member 122 and bracket 222, both of which cooperate with pivot pin brackets 224, fixedly attached to main frame assembly 220. Main frame assembly 220 is contained within and fixedly attached to bottom pan assembly 226. Finally, bottom pan assembly 226 is fixedly attached to roof mounting bars 228, shown in FIGS. 1–4 and 10. Roof mounting bars 228 are commercially available assemblies adopted for carrying luggage or equipment on the roof of a vehicle. Preferably, roof mounting bars 228 may be THULE brand bars, of the 300 or 400 model series.

In use, the person using wheelchair W may easily enter and exit an automobile equipped with wheelchair lift 10. After wheelchair lift 10 has been mounted to the roof of vehicle C, a person using the wheelchair may enter the vehicle by first opening the driver's door, then positioning themselves in the driver's seat. Handheld pendant 18 may then be actuated to lower extension assembly 14 to the side of vehicle C, as shown in FIG. 1. The wheelchair may then be folded, as shown in FIG. 3, and attached to extension assembly 14 by positioning tire T between lower wheel constraint 34 and upper wheel constraint 36, and then securing hook member 28 to a portion of the frame of wheelchair W, as shown in FIGS. 1 and 3. Handheld pendant 18 is again actuated, and wheelchair W, now attached to extension assembly 14, is raised to a horizontal position above bottom pan assembly 226 of wheelchair lift 10. Hood 16 is then lowered over the entire assembly, and the driver may move on. Upon arriving at the chosen destination, the above process is reversed.

While the preferred embodiments of the invention have been described, it should be understood that various changes, adaptations and modifications may be made therein without departing from the spirit of the invention and the scope of the appended claims.

What is claimed is:

1. A wheelchair lift for raising and lowering a wheelchair to and from a storage area on the roof of a vehicle and storing the wheelchair therein, the vehicle being equipped with a support assembly to which is mounted the wheelchair lift, comprising:

a supporting frame attachable to the support assembly for maintaining the wheelchair lift in position on the roof of the vehicle, said supporting frame having a proximate side and a distal side;

a lifting assembly hingedly attached to said proximate side of said supporting frame;

an extension assembly pivotally attached to said lifting assembly, the wheelchair being releasably attachable to said extension assembly;

drive means for motivating said lifting assembly;

motor means engageable with said drive means for motivating said drive means;

a rigid hood hingedly attached to said distal side of said supporting frame said rigid hood being movable between an open position and a closed position;

a hinge assembly fixedly attached to said rigid hood and pivotally attached to said supporting frame;

a hood control linkage for raising and lowering said rigid hood as said lifting assembly is motivated by said drive means; and a hood control disk having a peripheral surface for cooperating with said hood control linkage for raising and lowering said rigid hood.

2. The wheelchair lift described in claim 1, wherein:

said rigid hood is moved between said open position and said closed position by said drive means.

3. The wheelchair lift described in claim 2, wherein said hood control linkage further comprises:

a hinge assembly fixedly attached to said rigid hood and pivotally attached to said supporting frame; and a first end and a second end, said first end of said hood control linkage being pivotally attached to said hinge assembly and said second end of said hood control linkage cooperating with said lifting assembly for raising and lowering said rigid hood as said lifting assembly is motivated by said drive means.

4. The wheelchair lift described in claim 1, wherein said hood control linkage further comprises:

a roller mounted to said second end of said hood control linkage for bearing against said peripheral surface of said hood control disk.

5. The wheelchair lift described in claim 1, wherein said extension assembly further comprises:

a hinged adjustment portion for adjusting the position of said lifting assembly relative to the vehicle.

6. The wheelchair lift described in claim 5, wherein said extension assembly further comprises:

a swing arm pivotally attached to and extending between said lifting assembly and said hinged adjustment portion;

a wheelchair arm pivotally attached to said hinged adjustment portion;

attachment means connected to said wheelchair arm by which the wheelchair may be carried; and fastening means for fastening the wheelchair to said attachment means.

7. The wheelchair lift described in claim 6, further comprising:

a linkage member having a first end and a second end, said first end of said linkage member being pivotally attached to said hinged adjustment portion and said second end of said linkage member being pivotally attached to said lifting assembly for controlling the clearance of said extension assembly from the side of the vehicle.

8. The wheelchair lift described in claim 6, wherein said attachment means further comprises:

an upper latch arm member fixedly attached to said wheelchair arm;

a lower latch arm member fixedly attached to said upper latch arm member;

an upper wheel constraint fixedly attached to said wheelchair arm; and a lower wheel constraint fixedly attached to said wheelchair arm.

9. The wheelchair lift described in claim 8, wherein said fastening means is attached to said lower latch arm member.

10. The wheelchair lift described in claim 9, wherein said fastening means comprises a latch member releasably engageable with a hook fixedly attached to the wheelchair.

11. The wheelchair lift described in claim 1, wherein said drive means comprises a linear actuator tube assembly.

12. The wheelchair lift described in claim 11, wherein said linear actuator tube assembly comprises:

an outer tube member engageable with said lifting assembly; and a threaded rod having a first end and a second end, said second end of said threaded rod threadedly engaging an inner portion of said outer tube member and said first end of said threaded rod engaging said motor means.

13. The wheelchair lift described in claim 12, wherein said linear actuator tube assembly is pivotally attached to said distal side of said supporting frame.

14. The wheelchair lift described in claim 1, further comprising remote control means for remotely actuating said drive means.

15. A wheelchair lift for raising and lowering a wheelchair to and from a storage area on the roof of a vehicle and storing the wheelchair therein, the vehicle being equipped with a support assembly to which is mounted the wheelchair lift, comprising:

a supporting frame attachable to the support assembly for maintaining the wheelchair lift in position on the roof of the vehicle, said supporting frame having a proximate side and a distal side;

a lifting assembly hingedly attached to said proximate side of said supporting frame;

motorized drive means for motivating said lifting assembly;

a swing arm pivotally attached to and extending from said lifting assembly;

a hinged adjustment portion pivotally attached to said swing arm;

a wheelchair arm pivotally attached to said hinged adjustment portion, whereby said hinged adjustment portion permits adjusting the position of said of said wheelchair arm relative to the vehicle;

attachment means connected to said wheelchair arm by which the wheelchair may be carried; and fastening means for fastening the wheelchair to said attachment means.

16. The wheelchair lift described in claim 15, further comprising:

a rigid hood hingedly attached to said distal side of said supporting frame, said rigid hood being movable between an open position and a closed position.

17. The wheelchair lift described in claim 16, wherein:

said rigid hood is moved between said open position and said closed position by said motorized drive means.

18. The wheelchair lift described in claim 17, further comprising:

a hinge assembly fixedly attached to said rigid hood and pivotally attached to said supporting frame; and a hood control linkage having a first end and a second end, said first end of said hood control linkage being pivotally attached to said hinge assembly and said second end of said hood control linkage cooperating with said lifting assembly for raising and lowering said rigid hood as said lifting assembly is motivated by said motorized drive means.

19. The wheelchair lift described in claim 18, wherein said lifting assembly further comprises:

a hood control disk having a peripheral surface for cooperating with said hood control linkage for raising and lowering said rigid hood.

20. The wheelchair lift described in claim 19, wherein said hood control linkage further comprises:

a roller mounted to said second end of said hood control linkage for bearing against said peripheral surface of said hood control disk.

21. The wheelchair lift described in claim 15, further comprising:

a linkage member having a first end and a second end, said first end of said linkage member being pivotally attached to said hinged adjustment portion and said second end of said linkage member being pivotally attached to said lifting assembly for controlling the clearance of said extension assembly from the side of the vehicle.

22. The wheelchair lift described in claim 15, wherein said attachment means further comprises:

an upper latch arm member fixedly attached to said wheelchair arm;

a lower latch arm member fixedly attached to said upper latch arm member;

an upper wheel constraint fixedly attached to said wheelchair arm; and a lower wheel constraint fixedly attached to said wheelchair arm.

23. The wheelchair lift described in claim 22, wherein said fastening means is attached to said lower latch arm member.

24. The wheelchair lift described in claim 23; wherein said fastening means comprises a latch member releasably engageable with a hook fixedly attached to the wheelchair.

25. The wheelchair lift described in claim 15, wherein said motorized drive means comprises a powered linear actuator assembly.

26. The wheelchair lift described in claim 25, wherein said powered linear actuator assembly comprises:

a gear housing;

gear means contained within said gear housing;

a motor mounted to said gear housing engaged to said gear means;

a threaded rod having a first end and a second end, said first end of said threaded rod rotatably engaging said gear means; and an outer tube member threadedly engaged on an inner portion thereof by said threaded rod, said outer tube member engageable with said lifting assembly.

27. The wheelchair lift described in claim 26, wherein said powered linear actuator tube assembly is pivotally attached to said distal side of said supporting frame.

28. The wheelchair lift described in claim 15, further comprising remote control means for remotely actuating said drive means.

29. A wheelchair lift for raising and lowering a wheelchair to and from a storage area on the roof of a vehicle and storing the wheelchair therein, the vehicle being equipped with a support assembly to which is mounted the wheelchair lift, comprising:

a supporting frame attachable to the support assembly for maintaining the wheelchair lift in position on the roof of the vehicle, said supporting frame having a proximate side and a distal side;

a lifting assembly hingedly attached to said proximate side of said supporting frame;

an extension assembly pivotally attached to said lifting assembly, the wheelchair being releasably attachable to said extension assembly; and a powered linear actuator assembly for motivating said lifting assembly, said powered linear actuator assembly being pivotally attached to said distal side of said supporting frame, said powered linear actuator assembly including an outer tube member engageable with said lifting assembly, a threaded rod having a first end and a second end, said second end of said threaded rod threadedly engaging an inner portion of said outer tube member, and motor means, said first end of said threaded rod engaging said motor means.

30. The wheelchair lift described in claim 29, further comprising:

a rigid hood hingedly attached to said distal side of said supporting frame, said rigid hood being movable between an open position and a closed position;

a hinge assembly fixedly attached to said rigid hood and pivotally attached to said supporting frame;

a hood control linkage for raising and lowering said rigid hood as said lifting assembly is motivated by said drive means; and a hood control disk having a peripheral surface for cooperating with said hood control linkage for raising and lowering said rigid hood.

\* \* \* \* \*